United States Patent
Lawhon

(10) Patent No.: US 11,829,164 B2
(45) Date of Patent: Nov. 28, 2023

(54) DOOR CLOSER WITH POWER CLOSE

(71) Applicant: ASSA ABLOY Accessories and Door Controls Group, Inc., Monroe, NC (US)

(72) Inventor: Dustin Lawhon, Lilesville, NC (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 350 days.

(21) Appl. No.: 17/018,075

(22) Filed: Sep. 11, 2020

(65) Prior Publication Data

US 2021/0079704 A1 Mar. 18, 2021

Related U.S. Application Data

(60) Provisional application No. 62/899,434, filed on Sep. 12, 2019.

(51) Int. Cl.
*G05D 15/01* (2006.01)
*E05F 3/22* (2006.01)

(52) U.S. Cl.
CPC ............. *G05D 15/01* (2013.01); *E05F 3/222* (2013.01); *E05Y 2201/434* (2013.01);
(Continued)

(58) Field of Classification Search
CPC ............................. G05D 15/01; E05Y 2400/31
(Continued)

(56) References Cited

U.S. PATENT DOCUMENTS 8,169,169 B2 * 5/2012 Hass ........................ E05F 15/63
361/84
9,045,927 B1 * 6/2015 Hoffberg ................... E05F 3/10
(Continued)

FOREIGN PATENT DOCUMENTS

DE 102010030304 A1 12/2011

OTHER PUBLICATIONS

Assa Abloy Accessories and Door Controls Group, Inc., International Application No. PCT/US2020/050427, International Search Report and Written Opinion, dated Nov. 17, 2020.
(Continued)

*Primary Examiner* — Md Azad
(74) *Attorney, Agent, or Firm* — Moore & Van Allen PLLC; Jeffrey R. Gray

(57) ABSTRACT

A door closer may utilize a door closing device (e.g., spring) and a force adjustment device (e.g., a motor) in order to allow for manual door opening and assisted door closing. During operation, as a door is manually opened, the spring is loaded (e.g., compressed or tensioned) above its pre-loaded closed position state. Once manual opening is completed, the spring that is loaded during opening begins returning to the pre-loaded closed position state, and thus, moves the door automatically towards the closed position. Depending on the pre-loaded spring setting, the closing force of the door may not be enough to close the door, or to close the door with the preferred force. As such, during closing a controller may engage a motor not to drive the door directly, but to increase the pre-load of spring to increase the closing force in order to allow the door to close as preferred.

19 Claims, 4 Drawing Sheets

(52) U.S. Cl.
    CPC ... *E05Y 2201/456* (2013.01); *E05Y 2201/474* (2013.01); *E05Y 2201/626* (2013.01); *E05Y 2400/31* (2013.01); *E05Y 2400/354* (2013.01); *E05Y 2900/132* (2013.01)

(58) Field of Classification Search
    USPC .......................................................... 700/302
    See application file for complete search history.

(56) References Cited

U.S. PATENT DOCUMENTS

| | | | |
|---|---|---|---|
| 2003/0213092 A1 | 11/2003 | Fischbach et al. | |
| 2008/0222957 A1* | 9/2008 | Bienek | E05F 3/104 49/43 |
| 2016/0024831 A1* | 1/2016 | Houser | E05F 15/60 49/506 |
| 2019/0319557 A1* | 10/2019 | Dye | E05F 1/105 |

OTHER PUBLICATIONS

Assa Abloy Accessories and Door Controls Group, Inc., International Application No. PCT/US2020/050427, International Preliminary Report on Patentability, dated Mar. 24, 2022.

* cited by examiner

DOOR CLOSER WITH POWER CLOSE

CROSS REFERENCE AND PRIORITY CLAIM UNDER 35 U.S.C. § 119

The present application for a patent claims priority to U.S. Provisional Patent Application Ser. No. 62/899,434 entitled "Door Closer with Power Close," filed on Sep. 12, 2019, and assigned to the assignees hereof and hereby expressly incorporated by reference herein.

FIELD

The present invention relates to a door closer with a power close, and more particularly, to utilizing a force adjustment device, such as a motor, to adjust pre-loading of a spring as a door is opening and/or closing in order to decrease and/or increase the opening and/or closing forces during operation.

BACKGROUND

Door systems may include door operators, door closers, or other like systems that control the operation of opening and/or closing a door. A door operator is a device that is able to open and close a door or other barrier, or that aids in opening and closing a door or other barrier. Alternatively, door closers may be manually opened, and thereafter, use a spring or other device for closing the door.

SUMMARY

As will be described herein, a door closer may utilize a door closing device and a force adjustment device in order to allow for manual door opening and assisted door closing that meets entity (e.g., customer, building operator, regulators, manufacturer, or the like) regulations. The closing device may comprise a spring and/or a damper (e.g., an actuator and/or piston and cylinder, that is hydraulic, pneumatic, or the like, a second spring, or the like), while the force adjustment device (otherwise described as a force adjustment assembly), such as a motor, actuator, piston, solenoid, or the like, may be used to adjust the opening force and/or closing force of the closing device by adjusting the preload of the spring during opening and/or closing. As will be described in further detail herein, during operation as the door (or other barrier) is manually opened the spring is loaded (e.g., compressed, tensioned, or the like) above its pre-loaded closed position state (e.g., resting closed position). Once manual opening is completed, the spring that is loaded during opening begins returning to the resting state, and thus, moves the door automatically to the closing position. Depending on the pre-loaded spring setting, the closing force of the door may not be enough to close the door, or enough to close the door with the preferred force. As such, during closing a controller may engage a force adjustment device (e.g., motor, or the like) to increase the closing force (e.g., increase the pre-loaded spring) in order to allow the door to completely close and/or close with the preferred force. In the closed position the force may remain the same or may be decreased (e.g., in order to make it easier for the door to open to conform with operating requirements). Alternatively, the force adjustment device may also be utilized to decrease the preload of the spring when the door is closed or when a user begins to open the door in order to decrease the opening force required to open the door, and thus, making it easier for a user to open the door.

Embodiments of the invention comprise a door closer. The door closer comprises a closing device, wherein the closing device is configured to aid in closing a door by providing a closing force to the door. The door closer further comprises a force adjustment device operatively coupled to the closing device. The force adjustment device is configured to adjust the closing force as the door is being closed or adjust an opening force as the door is being opened.

In further accord with embodiments, the closing device comprises a spring, and the force adjustment device comprises a motor. The motor is operatively coupled to the spring and the motor adjusts the closing force or the opening force by adjusting a preload of the spring.

In other embodiments of the invention, the door closer further comprises a damper operatively coupled to the spring for controlling a closing speed of the door.

In yet other embodiments of the invention, adjusting the preload of the spring comprises turning a fastener to increase or decrease the preload of the spring.

In still other embodiments of the invention, the door closer further comprises a controller operatively coupled to the force adjustment device. The controller comprises one or more memory devices with computer-readable program code stored thereon, and one or more processing devices operatively coupled to the one or more memory devices. The one or more processing devices are configured to execute the computer-readable program code to engage the force adjustment device to adjust the closing force or the opening force.

In other embodiments of the invention, the door closer further comprises a position sensor operatively coupled to the controller. The one or more processing devices are configured to execute the computer-readable program code to identify a position of the door as it moves from an open position to a closed position.

In further accord with embodiments of the invention, as the door is moving from the open position to the closed position the force adjustment device increases the closing force when the door reaches an angle from the closed position. In other embodiments of the invention, the angle is a pre-determined angle from the closing position.

In yet other embodiments of the invention, when the position sensor indicates the door has stopped moving towards the closed position or the open position, the force adjustment device increases the closing force to move the door to the closed position.

In still other embodiments of the invention, when the position sensor indicates that the door has stopped moving and the door is in the closed position, the force adjustment device decreases the opening force.

In other embodiments of the invention, when the position sensor indicates that the door is moving towards the open position and the closing device is not set to a preferred opening force, the force adjustment device decreases the opening force to the preferred opening force.

In further accord with embodiments of the invention, the controller adjusts the closing force based on a force and position adjustment curve.

In other embodiments of the invention, the force adjustment device comprises a motor, an actuator, a piston, or a solenoid.

In yet other embodiments of the invention, the door closer further comprises a drive system operatively coupled to the closing device, a linkage assembly operatively coupled to the drive system, and a casing for concealing at least a portion of a controller, the force adjustment device, and the drive system. The casing and the linkage assembly are operatively coupled to the door, a door frame, or a wall to allow for opening and closing of the door.

Embodiments of the invention comprise a door closer. The door closer comprises a spring, a motor, a position sensor, and a controller. The spring is configured to aid in closing a door by providing a closing force to close the door. The motor is operatively coupled to the spring and is configured to adjust the closing force as the door is being closed. The position sensor is used to determine a position of the door. The controller is operatively coupled to the motor and the position sensor. The controller comprises one or more memory devices with computer-readable program code stored thereon and one or more processing devices operatively coupled to the one or more memory devices. The one or more processing devices are configured to execute the computer-readable program code to determine the position of the door and control the motor for adjusting the closing force of the spring based on the position of the door.

In further accord with embodiments of the invention, the controller is configured to identify the position of the door as it moves from an open position to a closed position, and increase the closing force of the spring using the motor when the door reaches an angle from the closed position.

In other embodiments of the invention, the controller is configured to identify the door has stopped moving towards a closed position and an open position, and increase the closing force of the spring using the motor to move the door towards the closed position.

In yet other embodiments of the invention, the controller is configured to identify the door is in a closed position, and adjust a preload of the spring to a set opening force.

In still other embodiments of the invention, the controller is configured to identify the door is moving towards an open position and the spring is not set to a set opening force, and adjust a preload of the spring to reduce an opening force until the opening force is the set opening force.

Embodiments of the invention comprise a method of operating a door using a force adjustment device operatively coupled to a closing device. The method comprises identifying the door is moving towards a closed position or the door is stopped before the closed position, and adjusting a closing force using the force adjustment device by increasing a preload of the closing device. Alternatively, the method comprises identifying that the door is moving towards an open position and adjusting the closing force using the force adjustment device by decreasing the preload of the closing device.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

DETAILED DESCRIPTION

The following detailed description teaches specific example embodiments of the invention. Other embodiments do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

Figure 1:
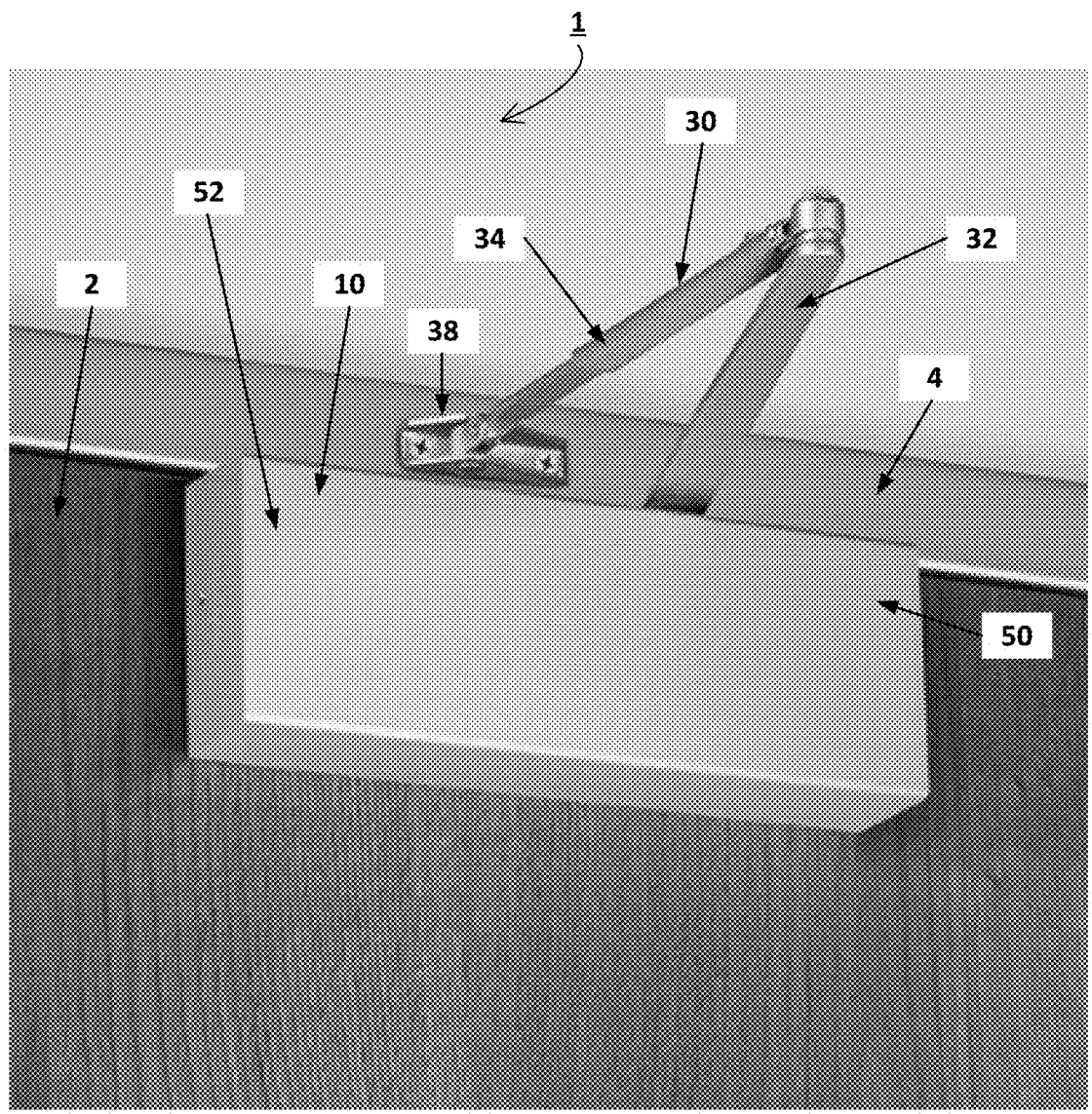
FIG. 1 is a perspective view of a door closer installed within a door assembly, in accordance with some embodiments of the disclosure.

As illustrated in FIG. 1, the door assembly 1 may comprise a door 2, a door frame 4, hinges (not illustrated), and a door closer 10. Additionally, as illustrated in FIGS. 1 to 3, the door closer 10 may comprise a controller 20, linkage assembly 30, one or more sensors (e.g., a position sensor, or the like) 40, a casing 50, a drive system 60, a closing device 100, and/or the like.

As illustrated in FIG. 1, the casing 50 is shown mounted to the door 2; however, in other embodiments the casing 50 may be mounted to the door frame 4 and/or a wall adjacent the door 2, or within a floor, or the like. The casing 50 is typically mounted in a particular orientation, such as horizontally, with respect to the horizontal top of the door 2 and/or horizontal top portion of the door frame 4. Alternatively, in other embodiments, the casing 50 may be mounted vertically or at another suitable angle with respect to the horizontal top of the door 2. In some embodiments the casing 50 may comprise a cover 52 that is operatively coupled to a back plate 54, and the back plate 54 is operatively coupled to the adjacent surface (e.g., door 2, door frame 4, wall, or the like). The casing 50 surrounds and encloses the components of the door closer 10 to reduce dirt and dust contamination, and to provide a more aesthetically pleasing appearance. It is understood that in some embodiments of the invention, the door closer 10 may be concealed within the door 2, the door frame 4, in a wall adjacent the door 2, or in the floor adjacent the door 2.

The linkage assembly 30 in some embodiments may comprise a first arm link 32 (e.g., a first rigid connecting arm link, or the like) and a second arm link 34 (e.g., a second rigid connecting arm link, or the like). The first arm link 32 may be fixed at one end to an output shaft 62 of a drive system 60, such that the first arm link 32 is rotated by the output shaft 62 as the drive system 60 moves the output shaft. The second end of the first arm link 32 is pivotally operatively coupled to a first end of the second arm link 34. The second end of the second arm link 34 is pivotally operatively coupled to the door frame 4 (e.g., directly, through a mounting bracket 38 fixed to the door frame 4, or the like). Alternatively, should the casing 50 be operatively coupled to the door frame 4 and/or the wall adjacent the door 2, the second arm link 34 may be pivotally operatively coupled to the door 2 (e.g., directly, through the mounting bracket 38, or the like). While a rigid two-arm linkage assembly 30 is shown, the linkage assembly 30 may be different than that illustrated and may include a greater or fewer number of arm linkages, sliding elements, shock absorbing arms, mounting brackets 38, or the like. Moreover, the linkages of the linkage assembly 30 may be assembled in any way such that the linkages may be situated at any angle with respect to the door 2, the frame 4, each other, or the like.

Figure 2:
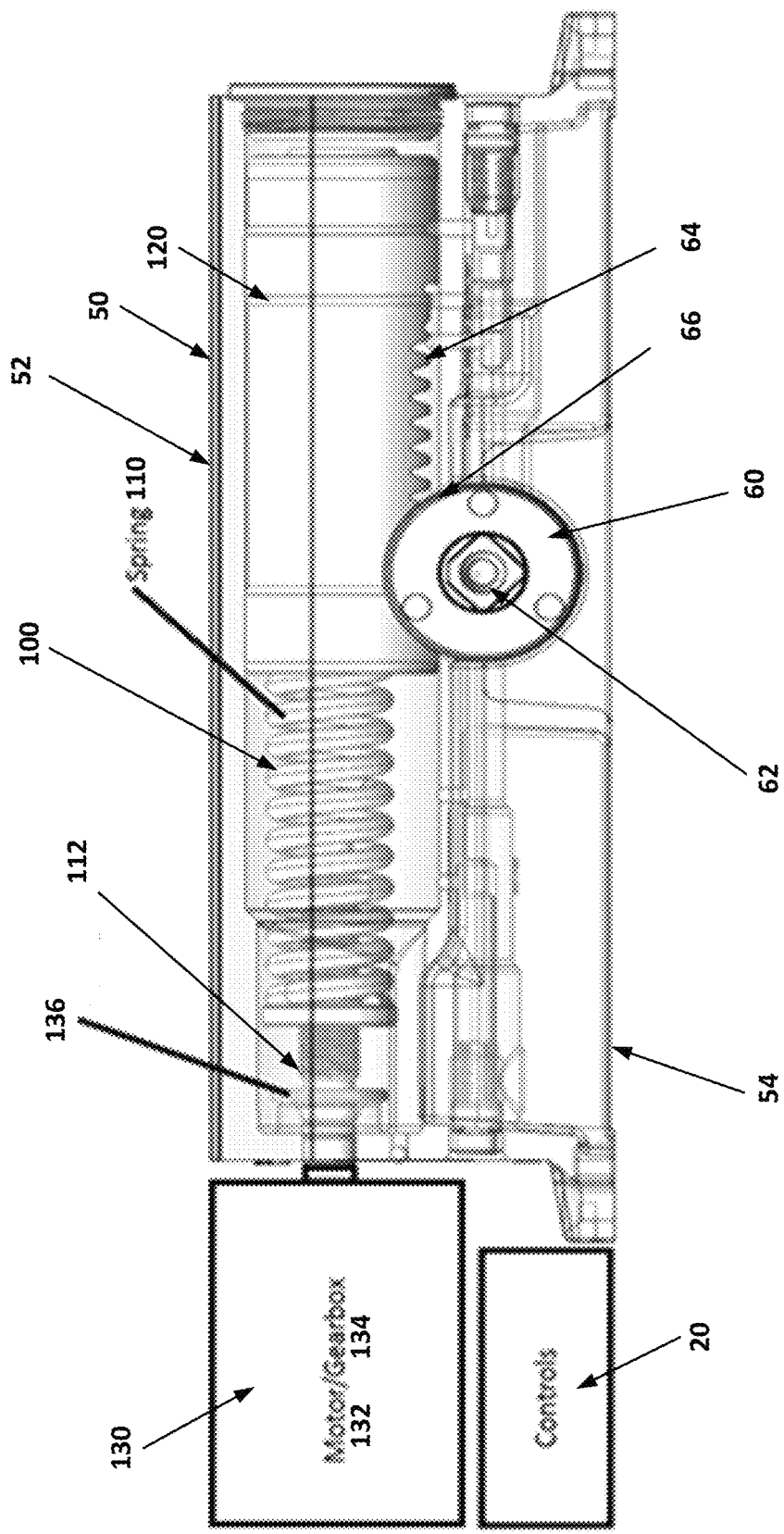
FIG. 2 is a top view representation of the components of the door closer, in accordance with some embodiments of the disclosure.
Figure 3:
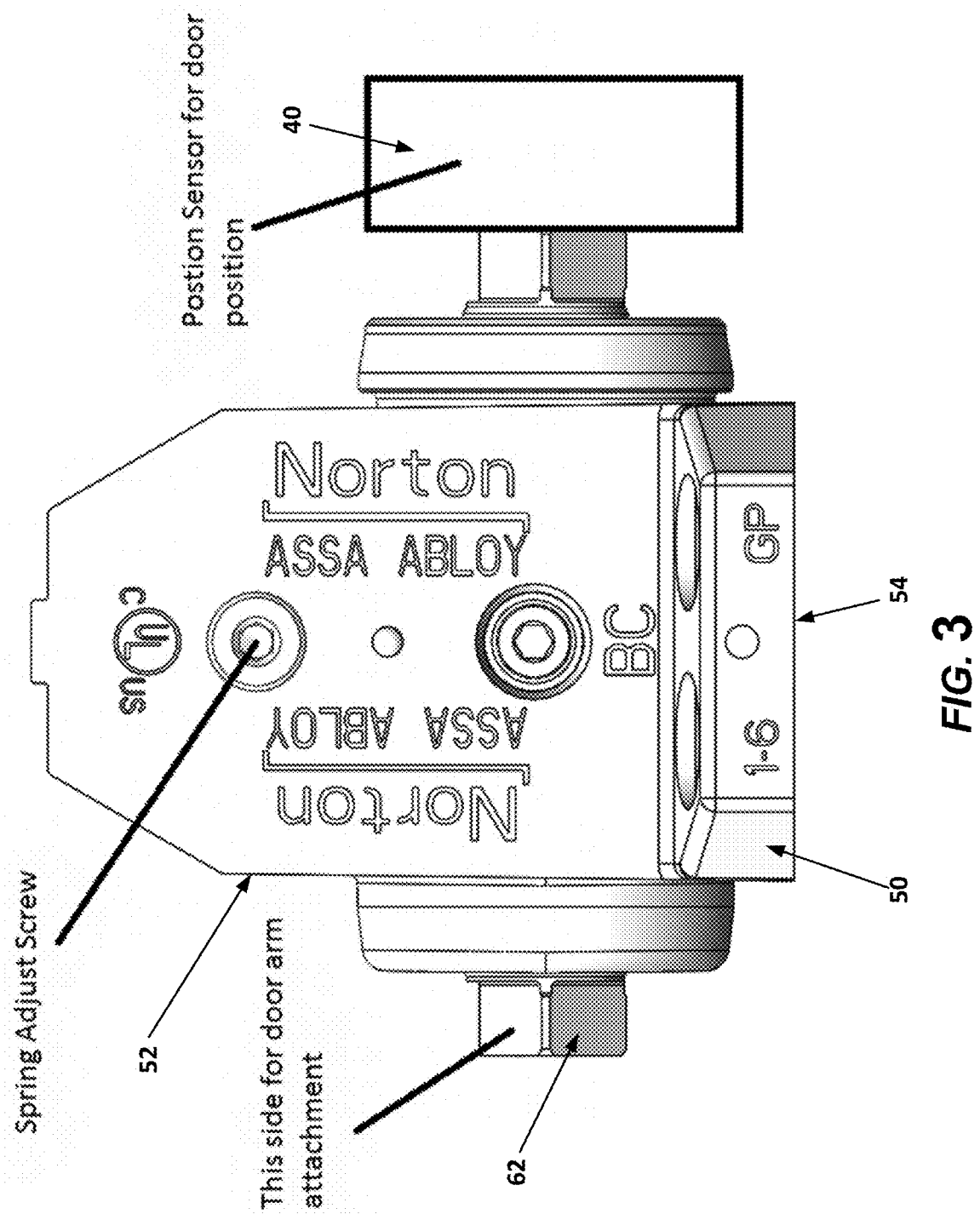
FIG. 3 is an end view representation of the door closer, in accordance with some embodiments of the disclosure.

As illustrated in FIGS. 2 and 3, the closing device 100 may comprise a biasing member (e.g., a spring 110, or the like), a damper 120 (e.g., an actuator or piston—hydraulic actuator, pneumatic actuator, or the like, a second spring, or the like), a force adjustment device 130 (e.g., a motor, actuator, piston, solenoid, any mechanical and/or electrical device, and/or the like). In some embodiments, the force adjustment device 130 (otherwise described as a force adjustment device 130) may comprise a motor 132, and optionally a gear assembly 134 (e.g., gearbox, or the like) or other mechanism through which the motor 132 may adjust the biasing member. The motor 132 (and potentially the gear assembly 134), spring 110, and/or damper 120 may be operatively coupled to each other. In some embodiments, the motor 132 may be operatively coupled to the gear assembly 134, which is operatively coupled to the spring 110, alternatively, the motor 132 may be operatively coupled to the spring 110 without the gear assembly 134. In some embodiments the motor 132, and potentially the gear assembly 134, may be operatively coupled to spring 110 through a connector 136 (e.g., a fastener 112, such as a screw, nut, or the like). Moreover, the spring 110 may be operatively coupled to the damper 120, which may be operatively coupled to the drive system 60.

During closing, the loaded biasing member, such as the spring 110, (e.g., loaded from manual opening beyond its pre-loaded rested position while the door is closed) begins to return to its resting position (e.g., closed position), and in some embodiments a damper 120 is engaged during closing to control the speed at which the biasing member (e.g., the spring 110) closes the door 2. As will be described in further detail herein, during closing of the door 2, as the loaded biasing member (e.g., spring 110) is moving the door 2 towards a closed position, the force adjustment device 130 (e.g., in particular, the motor 132, actuator, piston, or other device) may be activated by the controller 20 based on the position of the door 2, as determined by the position sensor 40. For example, the motor 132 may adjust the spring 110 to increase the closing force of the spring 110 by increasing the pre-loaded spring force of the spring 110. The motor 132 may adjust the spring 110 to increase the closing force of the spring 110 by turning the connector 136 which may in turn compress the spring 110 even as the door 2 is in the process of closing, as will be described in further detail herein. While the motor 132 is described as adjusting the spring 110, it should be understood that other types of force adjustment devices 130 may be utilized to adjust the spring 110, such as through an actuator, piston, solenoid, or the like, in the same or similar way as described with respect to the motor 132.

As will also be discussed in further detail herein, when the door 2 is in the closed position, the force adjustment device 130 may decrease the pre-load of the biasing member (e.g., spring 110, or the like) in order to decrease the opening force (alternatively described as decreasing the closing force) required to open the door 2. As will also be discussed in further detail herein, when the door 2 is to be opened or when the door 2 in the process of opening the force adjustment device 130 may decrease the preload of the biasing member (e.g., spring 110) to decrease the opening force (alternatively described as decreasing the closing force) in order to aid a user in the manual opening of the door (e.g., reducing the forced required to load the spring during opening of the door 2).

A drive system 60 may be operatively coupled to the linkage assembly 30 and the closing device 100. The drive system 60 may be utilized in order to transfer the closing force from the closing device 100 to the linkage system 30. Consequently, the drive system 60 may comprise any type of mechanical connection that transfers closing forces from the closing device 100 to the linkage system 30 through an output shaft 62. In some embodiments, the drive system 60 may comprise a rack 64 and pinion 66. The rack 64 may be operatively coupled to the closing device 100, such as to the damper 120 (e.g., actuator, piston, second spring, or the like) or another member operatively coupled to the closing device 100. The pinion 66 may be operatively coupled to the rack 64 and output shaft 62 (or the pinion 66 may be a part of the output shaft 62). As such, the pinion 66 may be operatively coupled to the linkage system 30 (e.g., directly or through the output shaft 62). During operation of the closing device 100 that closes the door 2, the drive system 60 transfers the closing force from the closing device 100 to the linkage assembly 30 in order to close the door 2.

It should be understood that the closing device 100 may be adjusted based on the use of a controller 20 and/or a sensor (e.g., a position sensor 40). As illustrated in FIG. 2, the controller 20 may be in communication with the closing device 100 (e.g., the force adjustment device 130, in particular, the motor 132, or another like device). In some embodiments, the controller 20 controls the operation of the force adjustment device 130 (e.g., the motor 132) and functions to transmit appropriate control signals to the force adjustment assembly 130 (e.g., the motor 132) for actuating the force adjustment device 130 (e.g., motor 132) to adjust the closing force (e.g., spring force of the spring 110, such as through the gear assembly 134, the connector 136, or the like). By way of example, the controller 20 may control the force adjustment device 130 as the door 2 is closing, opening, in a closed position, in a static position.

As will be discussed in further detail herein with respect to FIG. 4, the controller 20 will activate the force adjustment device 130 to adjust the closing force (e.g. increasing the force for closing and/or opening by increasing the pre-loading force of the spring 110) when the door 2 is moving towards the closed position, a particular defined position of the door 2 is reached (e.g., at a particular angle from the closed position), the speed or acceleration of the door falls below a particular target speed or acceleration. Alternatively, the closing force may be changed to meet a stored target force during the operation of the door, and/or based on a position curve that defines how the door 2 should be closed. Moreover, should the door 2 reach the closed position, change from moving towards a closed position to an open position (e.g., manually opened by a user during closing), be in the closed position and receive an indication that the door is going to be opened (e.g., a sensor identifies a user is in the zone of the door, a handle is activated, or the like), or begin to be moved from the closed position to the open position (e.g., as detected by a sensor), then the controller 20 may engage the force adjustment device 130 to adjust the pre-loaded spring 110 (e.g., decrease the pre-load in the spring 110) in order to decrease the force required for opening (e.g., decrease the opening and/or closing force) of the pre-loaded spring. In some embodiments, the identification that the door 2 is about to be opened may be based on a user engaging (e.g., moving) a door handle (e.g., push bar, rotating a handle, or the like), a user being identified in a particular zone (e.g., through the use of a pressure pad, sensor, camera, motion sensor, or the like), or other like detection method.

As such, the force adjustment device 130 may be utilized at any point in time or location of the door 2 as it is opening, closing, or at rest (e.g., in any resting open position or in a resting closed position) in order to set the force required to open and/or close the door. It should be understood that in some embodiments the force may be set to a static value or the force may be dynamic as the door is moving to different positions and/or as different conditions are identified with respect to the movement of the door. For example, the biasing member pre-load (e.g., the spring 110 pre-load) may not only be adjusted based on the direction of movement, but also based on the speed and/or acceleration of the movement of the door 2 in order to aid in controlling how fast the door 2 is moving. Specifically, should the door 2 be moving too slow (even if it has the proper force setting) the biasing preload may be adjusted to allow the door 2 to move at a higher rate of speed (e.g., a child may be moving the door 2, and as such, the opening force may be reduced). Alternatively, should the door 2 be moving too fast (even if it has the proper force setting) the biasing member may be adjusted such that the speed of the door 2 is reduced (e.g., an adult may be opening the door too quickly). Additionally, in some embodiments, should the door 2 be closing and identify that that an object (e.g., user, animal, or inanimate object) is located in the path of the door (e.g., through the use of a sensor 40), the adjustment of the biasing member may be bypassed (e.g., forgo increasing the closing force) or the biasing member may be adjusted (e.g., decreasing the closing force) to keep the door 2 from pushing up against the object.

Consequently, the door 2 will be able to be opened in order to meet any entity requirements (as will be discussed in further detail herein), and also will be able to be closed with a force that is greater than what would naturally occur by the closing device 100 (e.g., the spring 110) itself without adjustment of the pre-load of the closing device 100 (e.g., the spring 110).

It is to be understood that although the controller 20 used to operate the door 2 is shown mounted within the casing 50, as illustrated in FIG. 2, the controller 20 could also be housed separately from the door closer 10 such as within the door 2, frame 4, wall, floor, ceiling, or remotely, such as in a mechanical room with communication capabilities (e.g., wireless or wired), or the like.

The controller 20 may be part of an overall control system which may include one or more input and/or output devices that may be operatively coupled to the controller 20. The input devices may include physical inputs (e.g., keys, buttons, a touchscreen, speaker, or other like inputs that allow for a selection of the operation of the door closer 10). The input devices may further include ports through which communication may be made (e.g., USB, USB-C, microUSB, lighting, or other like ports). The output devices may include devices (e.g., screens, such as an LCD screen, touchscreen, or the like, microphones, or the like) that provide information to a user (e.g., an installer, operator, technician, or the like). In still other embodiments, the input and/or output devices may be incorporated into a user computer system (e.g., a mobile device, such as remote control, smartphone, computer, laptop, tablet, or the like), and such user computer system may communicate wirelessly with controller 20 over a wireless connection or may otherwise be connected through a wire.

It should be understood that should a wireless connection be utilized, the wireless communication may occur over any type of wireless network (e.g., external Wi-Fi network, the cellular network or other external network), or such communication may occur directly between the controller 20 and the user computer system such that the controller 20 does not require access to an external network. In some embodiments, the user computer system communicates with a communication device within the controller 20, with or without communicating with an external wireless network (e.g., external Wi-Fi network, LAN or WAN, or other external wireless protocol). In some embodiments, the controller 20 may be directly coupled to, and may directly communicate with, a user computer system via a wireless communication interface that communicates using a wireless networking protocol, such as WiFi based on the institute of Electrical and Electronics Engineers (IEEE) 802.11 standards, Bluetooth short-wavelength UHF radio waves in the ISM band from 2.4 to 2.485 GHz, a proprietary communication interface or other wireless access technology whether or not described herein.

While in some embodiments, a communication interface communicates with the user computer system over a short range via a wireless connection such as WiFi, Bluetooth or other wireless access technology, a wireless connection may operate over long or intermediate ranges and may include intervening networks. In this regard, the controller 20, or the door closer 10 itself, may comprise a transceiver that communicates with the user computer system and that is configured to operate with one or more air interface standards, communication protocols, modulation types, and access types. By way of illustration, the transceiver that may be configured to operate in accordance with any of a number of first, second, third, fourth, fifth, and/or the like generation communication protocols and/or the like. For example, the door closer 10 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LITE protocols, with 3GPP protocols, with fifth-generation (5G) wireless communication protocols, and/or the like. The door closer 10 may also be configured to operate in accordance with non-cellular communication mechanisms, such as via a wireless local area network (WLAN) or other communication/data networks.

It should be further understood that the input and/or output devices operatively coupled to the controller 20 and/or the user computer system may utilize one or more user interfaces (e.g. web pages, application interfaces, or the like) that are accessible directly on the one or more input and/or output devices in the door closer 10, and/or on the user computer system that communicates with the controller 20 over the wireless communication interface. The user interfaces can be used for setup, diagnostics, input and output programming, settings, or the like related to the operating parameters and/or operation of the door assembly 1 and/or the components thereof. As such, it should be understood that the one or more input and/or output devices, and/or the user computer systems may allow for programing of the closing device 100 by setting and/or storing the operating parameters for the operation of the force adjustment device 130 to control the closing of the door 2, as well as the opening of the door 2.

Figure 4:
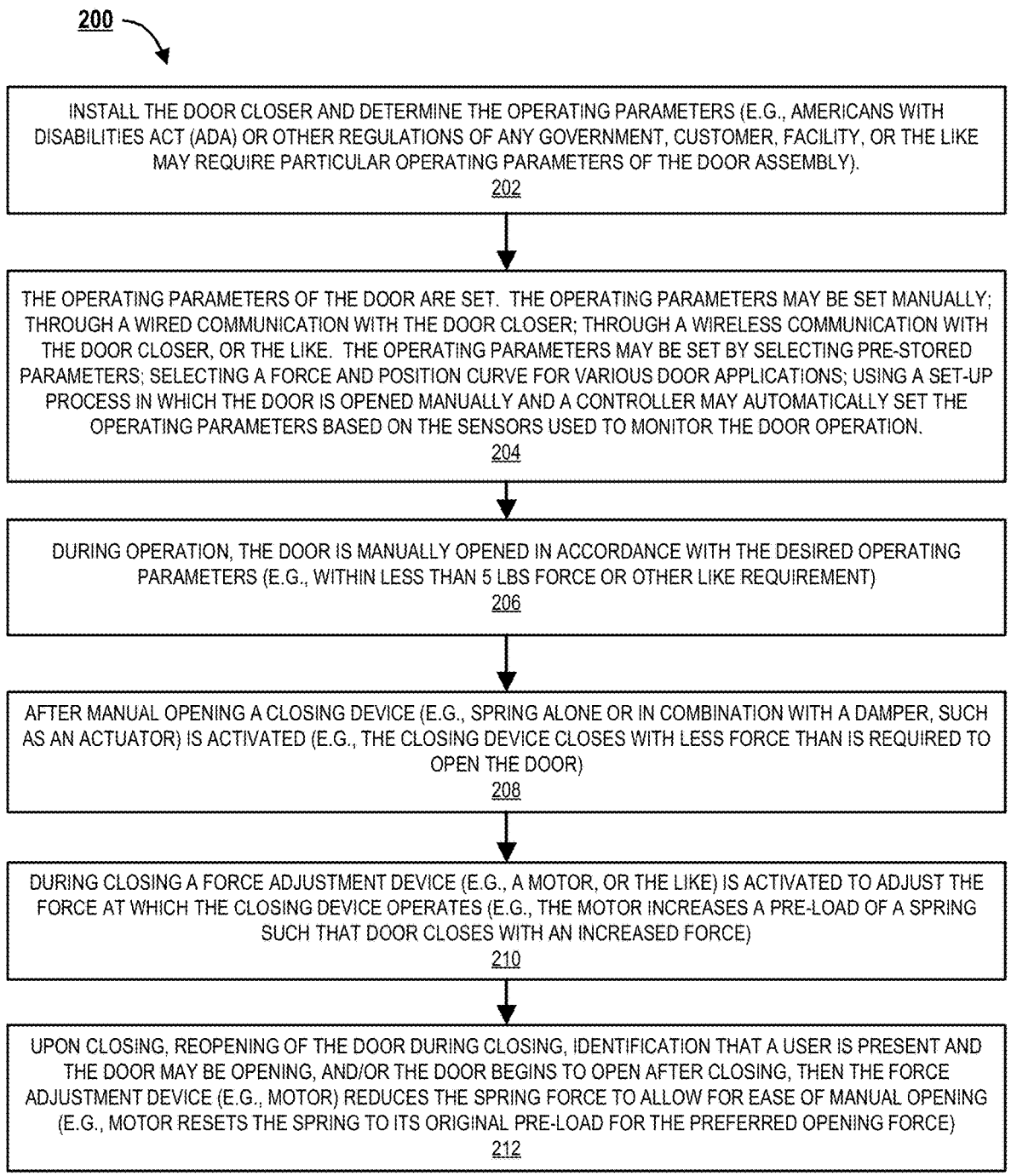
FIG. 4 is a block diagram illustrating a door closer installation, set-up, and operation process, in accordance with some embodiments of the disclosure.

FIG. 4 illustrates a process flow 200 for the installation and operation of the door closer 10 with dynamic operating force (e.g., adjustable opening and/or closing force during operation). As illustrated by block 202 of FIG. 4, a user (e.g., installer, or the like) installs the door closer 10. Moreover, the user determines the operating parameters for the particular application in which the door closer 10 is being installed. The operating parameters may be based on entity requirements, size of the door, type of hardware (e.g., hinges 6, locks, strike plates, or the like), purpose of the door, or the like.

As previously discussed herein, the operating parameters for the door closer 10 and/or door 2 may be set based on operating requirements from different entities. For example, the operating requirements may be set based on statutes, regulations, rules, suggested requirements, or the like set by a governmental entity (e.g., legislative act, agency requirements, or the like). For example, in some embodiments the operating requirements may be set in order to comply with the requirements of the Americans with Disabilities Act (ADA). However, the operating requirements may be set in order to comply with any other regulations set by any government, agency, standards body, consortium of industry members, or the like. Additionally, or alternatively, the operating requirements may be set by the customer purchasing the door, contractor installing the door closer 10, facility in which the door closer 10 is being installed, entity that will operate the door closer 10, or the like, and thus, may have operating requirements that are more stringent than as required by any government, agency, standards body, or the like. It should be understood that the operating parameters may not only include the force requirements for opening and/or closing the door, but also when to make adjustments to the force requirements, such as when the door is closed, when the door moves from closing to opening, when the door moves from opening to closing, when the door is left in an open position, when the door reaches a particular angle from a closing position, or the like. It should be understood that before any action is taken with respect to adjusting an opening and/or closing force, the force adjustment may not be made for fractions of a second, one, two, three, four, five, six, seven, eight, nine, ten, or other like seconds, or the like (or ranging between, overlapping, or falling outside of any of these values) in order to make sure that there has been a change in the operating parameters of the door closer 10 before a force adjustment is made.

Block 204 of FIG. 4 further illustrates that the user (e.g., installer installing the door or door closer, technician servicing the door or door closer, or the like) may set the operating parameters as previously discussed herein. The operating parameters may be set in any number of different ways, such as manually through input and/or output devices within the door closer 10 (e.g., a touchscreen, a port, or the like), a wired connection between the controller 20 and a user computer system and/or wireless communication between the controller and/or the user computer system, as previously discussed herein. Alternatively, it should be understood that the operating parameters may be pre-defined before the door closer 10 is installed, and as such, the user (e.g., installer) may only have to select one of the pre-defined set of operating parameters. Alternatively, and/or additionally, the door closer 10 may be set by the provider of the door closer 10 before the door closer 10 is ever shipped in order to reduce the installation requirements of the user (e.g., the door closer 10 may be installed without having to set the operating parameters).

As such, in some embodiments the force settings for opening and closing the door 2, the speed settings for closing the door 2 (e.g., how long it takes to close the door), acceleration settings for closing the door 2 (e.g., how fast the door closes), and/or the time required to change the force requirements as operation of the door changes, may be selected by the user. Additionally, and/or alternatively, the user may select pre-determined closing curves that provide the settings for opening and/or closing the door 2. Additionally, and/or alternatively, the operating parameters may be set automatically by entering a setup mode, manually opening the door, allowing the door to close, and allowing the controller 20 to automatically determine the operating parameters needed to close the door 2 based on one or more door sensors 40 and/or stored force and/or position curves. For example, the force required to open the door 2 may be identified (e.g., based on a force sensor). Moreover, the speed and position of the door 2 as it is closing may be determined at multiple closing positions (e.g. at different angles during closing). Furthermore, when the door 2 stops moving the controller 20 may determine the position of the door 2 when it stops. The information determined from the manual opening, the closing of the door 2 at multiple positions, and the location of the door when it stops may be used to automatically set the opening force required to open the door (e.g., by adjusting the spring pre-load at the closed position), the adjustments that will be made to the spring loading at different positions during closing, or the like. The user installing the door 2 may manually open the door 2 and allow the door 2 to close a plurality of times (e.g., two or more times) in order for the user to review and/or adjust the opening and/or closing parameters (e.g., forces, speeds, acceleration, or the like). The opening and closing parameters may be reviewed by the user on a user interface (e.g., on the user computer system, on an output of the door closer 10, another suitable GUI, or the like). In response, the user may make adjustments to the door closer 10 and/or other components of the door assembly 1 (e.g., hinge alignment, door and frame connection, strike plate and/or locking interaction, or the like) in order to adjust the opening and/or closing of the door 2.

After installation, the opening spring force and/or the dynamic closing spring force (e.g., based on a force and position curve, or the like) may be set for controlling the force adjustment device 130 (e.g., in particular for controlling a motor 132, or other force adjustment device). It should be understood that during operation of the door 2, the motor 132 is used to adjust the pre-load of a spring 110 instead of using the motor 132 to drive the door 2 itself.

As illustrated by block 206 of FIG. 4, during operation of the door 2, the door 2 is manually opened in accordance with the preferred operating parameters. For example, the door 2 may be set to open with a force that is 5 lbs. or less (e.g., in accordance with entity requirements as will be described in further detail herein). As such, in the closed position of the door 2, the controller 20 may use the force adjustment device 130 to set the pre-load of the biasing member (e.g., the spring 110) to a position that will allow for manual opening of the door 2 using a force that is 5 lbs. or less. As illustrated in FIGS. 2 and 3, in some embodiments of the invention the biasing member is a spring 110 and the force adjustment device 130 may change the pre-loaded spring force by adjusting a spring fastener 112 (e.g., a spring screw, nut, or the like) in order to change the pre-load of the spring 110. As the door 2 is manually opened, one or more sensors 40 may be used to capture the opening force of the door 2, which may be used to make further pre-load adjustment, stored in memory, and/or sent for analysis.

As illustrated by block 208, after manual opening, a closing device 100 (e.g., the spring 110 alone or in combination with a force adjustment device 130 and/or a damper 120, or the like) begins to close the door 2. Unless the pre-load of the spring has been adjusted, the closing device 100 will begin to close the door 2 after completion of manual opening with a force that is less than the manual opening force. For example, as will be discussed in further detail herein, the closing force may be about half of the opening force (e.g., based on door closer with approximately 50% efficiency).

Block 210 of FIG. 4 illustrates that during closing a sensor 40 may provide information to the controller 20 regarding the closing of the door 2 (e.g., angle of the door, speed of the door 2, or the like). For example, a position sensor 40 may determine the location, speed, and/or acceleration of the door 2 as the door 2 is closing. The operation of the door 2 captured from the one or more sensors 40 may be compared with the operating parameters set for the door closer 10. In response to the comparison of the operation of the door 2 with stored operating parameters, the controller 20 may engage the force adjustment device 130 to change the operation of the door 2. For example, should the door 2 reach a particular angle (e.g., with respect to the closed position, or the like), slow to a particular closing speed, slow to a particular deceleration, and/or a combination of the forging, the controller 20 may operate the motor 132 (or other force adjustment device 130) to add additional pre-loading to the spring 110 in order to change the operation of the door closer 10, and thus, the operation of the door 2. In some embodiments, the controller 20 may increase the pre-load of the spring 110 in order to maintain the closing speed and/or deceleration of the door 2, increase the speed and/or acceleration of the door 2, and/or the like. By adjusting the pre-load of the spring 110 as the door is closing, the increased closing force is greater than a closing force that would occur without adjusting the pre-load of the spring 110.

For example, should a door assembly 1 have an opening force that is 5 lbs., the door typically would only have a closing force of approximately 2.5 lbs. (e.g., based on 50% efficiency of the door assembly). The present invention allows for the adjustment of the closing force, such that the door may maintain an opening force that is 5 lbs. or less, and during the closing the closing force is adjusted such that the door 2 closes with a force that is 2.5 lbs. or greater (e.g., 3, 4, 5, 6, or the like lbs. that is larger than a typical closing force without the closing force adjustment). It should be understood that while the force to open the door manually is going to be greater than the force at which the door is going to close due to the efficiency of the door closer, adjusting the biasing member (e.g., spring 110) will change both the opening force and the closing force. For example, should the opening force be 5 lbs. (e.g., manual opening) the closing force may be 2.5 lbs. (e.g., automatic closing). By increasing the pre-load of the biasing member during closing to increase the closing force (e.g., increasing the closing force to 5 lbs.), the opening force will also be increased (e.g., increased to 10 lbs., or the like). Moreover, the reverse it also true, in that by decreasing the pre-load of the biasing member for opening in order to decrease the opening force (e.g., decreasing the opening force to 5 lbs.), the closing force will also be decreased (e.g., decreased to 2.5 lbs., or the like).

Block 212 of FIG. 4 further illustrates that after the door 2 reaches the closed position; should the operation of the door 2 change from closing to opening before the door 2 reaches the closed position (e.g., should the door be manually reversed such that it begins to open instead of closing); should a user be identified as potentially opening the door (e.g., may be detected near the door by a sensor); or should be door begin to open (e.g., a user operates a handle, the door begins to move from the closed position to an open position), then in response the force adjustment device 130 may be activated to change the pre-load of the biasing member (e.g., the spring 110) such that the door will open with the preferred opening force, as described herein. It should be understood that adjusting the closing force of the door 2 to increase the force at which the door 2 is closed will also increase the force required to open the door 2 (e.g., from a closed position or when reversing a closing door to an opening door). As such, after the door 2 is in a closed position and/or when the door 2 reverses from closing to opening, the motor 132 is activated to reduce the pre-load of the spring 110 in order to return to the opening force to the preferred opening force. That is, by returning to the preferred opening force the door can be opened manually with a force that meets the set operating parameters.

It should be understood that the force adjustment device 130 (e.g., motor 132, or other device) may be able to adjust the pre-load of the biasing member (e.g., spring 110) as the door 2 is moving (e.g., as the spring 110 is being compressed and/or expanded during closing and opening). It should be further understood that the adjustment to the pre-load may occur within fractions of a second, seconds, or the like in order to quickly adjust the pre-load for dynamic operation of the door 2 as the door is opening, closing, or changing directions.

With respect to utilizing an actuator, piston, solenoid, motor 130 or other like force adjustment device 130, these types of force adjustment devices 130 may provide linear or rotational movement. The linear movement of these force adjustment devices 130 may be used to pre-load a biasing member (e.g., a spring 110 in compression or tension), and/or adjust the pre-load to change the closing and/or opening force during operation of the door closer 10. Alternatively, rotational movement of these force adjustment devices 130 may be used to pre-load the biasing member (e.g., spring 110 in compression or tension) through rotation of a component that biases the force adjustment device 130. It should be understood that the linear or rotational movement of the force adjustment device 130 may pre-load (or adjust the pre-load during operation) the biasing member through linear and/or rotational pre-loading.

In some embodiments of the invention, the force adjustment device 130 and/or other components of the door closer 10 (e.g., the controller 20, the damper 120, and/or the like) may be powered through a battery (e.g., located within or outside of the door closer 10), through a wired connection (e.g., wired power provided through the building, or the like), and/or through various power sources (e.g., wired solar power, or the like).

The present invention described herein solves a number of problems in the industry. For example, particular requirements, such as regulations required by the ADA or other regulations of other entities, have become more important for businesses to meet. In particular, door closers 10 may be required to allow for manual opening with an opening force of 5 lbs. or less (e.g., measured 1 inch from the edge of a 36 inch door, which is 35 inches from a pivot point). However, other entities may have other requirements for manual door opening (e.g., opening with a force greater than or less than 5 lbs.). Door closers 10 may have an adjustable spring that can be adjusted to meet different opening requirements. As noted herein, the closing force of a door 2 that utilizes a door closer 10 is going to be less that an opening force required to manually open the door 2 due to mechanical losses in the door assembly 1. For example, the friction of moving components (e.g., hinges, door and frame interaction, linkages, or the like) reduce the efficacy of door closers 10. Frictional forces may be mitigated using high quality machining and high performing lubrication, but in spite of this, generally, door closers 10 have about 50% efficiency, and potentially less depending on the type of door assembly 1 and the installation of the door assembly 1. As such, the efficiency of the door closer 10 may be 70, 60, 50, 45, 40, 35, 30, 25, or other the like percent (or range between these values, overlap these values, or fall outside of these values). For example, with a typical efficiency of about 50%, a door closer 10 set to open with no more than 5 lbs. of force will have a maximum of 2.5 lbs. of closing force (e.g., assuming there is no drag of misalignment in the door/frame/hinges). This amount of closing force (e.g., 2.5 lbs.) is typically not large enough to close the door completely.

Typical door closers that utilize a spring compress the spring when the door is opened, store energy in the spring, then the spring closes the door when the door is released. Should the door closer have a damper, the fluid (e.g., oil, air) and valves (or other damping components) control the speed of the door closing in response to the spring returning to its pre-loaded position at the door's closed position. Door closers typically have adjustable springs (e.g., size 1-6, or other sizes) to meet a variety of door application closing force requirements. Agencies (e.g., Builders Hardware Manufacturers Association—BHMA, other agencies, or the like) define the closing force of the adjustable springs (e.g. sizes 1, 2, 3, 4, 5, 6, or the like) that are used in various industries. For example, a size 1 spring may only have 2 lbs. of closing force, while a size 6 spring may have 14 lbs. or more of closing force. When a requirement is set for opening a door with 5 lbs. of force or less (e.g., as required for ADA compliance), installers typically setup a door closer with a size 1 spring, which typically results in a door opening with no more than 5 lbs. of force, and with a 50% efficient door closer, the door would close with approximately 2.5 lbs. of force. Door closer spring sizes are typically set during initial installation of the door closer 10 and are never adjusted again.

Based on current options, the only way to vary the opening and closing forces of a door is to utilize a door operator instead of a door closer. Door operators can be pushed open manually with a specified force (e.g., no more than 5 lbs. of force, or the like) because door operators utilize motors with an automatic open cycle to allow them to meet specified force requirements (e.g., ADA requirements, or the like). For example, a motor in the door operator is used to assist in opening the door automatically (e.g., with or without the aid of a user manually opening the door 2). That is, the motor is actually used to move the linkages of the door operator in order to cycle the door open and/or closed. As such, door operators may use powerful springs (e.g., which would typically take much more than 5 lbs. of force to open without the assistance of the motor, such as a size 6 spring, or the like). The more powerful spring used in door operators has significantly more closing power. Also, door operators may utilize the motor to add closing force in addition to the spring closing force. That is, the motor and the spring close the door together (e.g., a cumulative closing force that would be greater than using just the motor or just the spring). The trade-off with respect to using door operators over door closers is that door operators are much more expensive than door closers. As such, should a business be required to meet specific door opening requirements (e.g., opening with 5 lbs. of force to meet ADA or other entity requirements), the business is forced to spend orders of magnitude more on a door operator in order to meet the requirements. Furthermore, door operators, when compared to door closes, require additional related costs such as, the costs associated with the accessories required to use a door operator (e.g., wall plates, electric strike, and signs), as well as the additional installation and setup costs required for the more complex door operators and the accessories. In aggregate, the cost to install a door operator can be 5, 6, 7, 8, 9, 10, 12, 15, or the like times the cost of a door closer.

As described herein, the present disclosure provides an improved door closer that allows for the adjustment of the pre-load of the spring closing force before, during, and/or after operation of the door 2 as the door is opening or closing in order to allow the door to close while still allowing manual opening of the door to meet preferred force requirements (e.g., ADA opening force of 5 lbs., or the like). Unlike the door operators that require a large motor to physically move linkages and/or compress a spring with a large opening force, the door closer may utilize a much smaller motor (or other force adjustment assembly) that is not required to move the door itself, but instead is used to adjust the pre-load of the spring as described herein in order to provide the preferred opening and closing forces at a much lower cost.

Consequently, the door closer 10 of the present disclosure provides a number benefits. As one example, the initial biasing member preload (e.g., spring 110 preload) may be set so that the door meets ADA requirements at all times (e.g., opening force less than 5 lbs). As the door is closing, if the controller 20 determines the door is not going to close or has not closed (e.g., stopped) the force adjustment device 130 (e.g., motor 132, or the like) will add additional preload to the biasing member (e.g., additional spring pre-load) in order to close the door. Moreover, once the door has closed the biasing member preload (e.g., spring preload) may be backed off to the ADA opening requirements. Therefore, in the event of a power outage ADA requirements for the opening force takes priority over the door closing force requirements.

In another example, the initial biasing member preload (e.g., spring 110 preload) may be set so that the door meets fire safety codes or other codes (e.g., door must always close even in power outage scenarios). As the door is being opened, the force adjustment device 130 (e.g., the motor 132, or the like) reduces the biasing member preload (e.g., spring preload) to make the door open with a reduced force (e.g., feel lighter and/or meet ADA requirements). Once the door starts to close the force adjustment device 130 (e.g., motor 132, or the like) adds biasing member preload (e.g., spring preload, or the like) to close the door, as described herein, and maintains the closing preload when closed. Therefore, in the event of a power outage the door closing force (e.g., to meet fire safety requirements) takes priority over ADA opening force requirements.

In some of the embodiments of the door closer 10 system, and the methods provided herein, information is sent to and received from the controller 20 of the door closer 10 to allow controlling, monitoring and adjusting of information pertaining to the operation of the door closer 10. As such, the controller may comprises one or more processing devices, one or more memory devices (having computer readable code stored thereon), one or more communication devices, the one or more input/output devices, or the like, all of which may be operatively coupled to each other, in order to operate the door closer 10 as described herein. The one or more processors (e.g., a microprocessor or a microcontroller) may communicate with the memory for storing and/or accessing instructions and data (e.g., computer readable instructions, the operating parameters, operation of the door closer, user information related to the users that are authorized to install or use the door, how users use the door, other detection information, and/or the like) in order to operate the door closer 10 system and provide the functionality described herein. Some of the one or more memories are non-volatile, storing configuration information and program code. As used herein, a "processor" generally refers to a device or combination of devices having circuitry used for implementing the communication and/or logic functions of a particular system. For example, the processor may include one or more digital signal processor devices, microprocessors, and/or microcontrollers and other support circuits and/or combinations of the foregoing. Control and signal processing functions of the system are allocated between these processing devices according to their respective capabilities. The controller 20 may further include functionality to operate one or more software programs based on computer-executable program code, which may be stored in the one or more memory devices. As the phrase is used herein, the controller 20 may be "configured to" perform a certain function in a variety of ways, including, for example, by having one or more general-purpose circuits perform the function, by executing particular computer-executable program code embodied in computer-readable medium, and/or by having one or more application-specific circuits perform the function.

The door closer 10, such as the controller 20, can include computer program code which, when executed by the processor, causes the door closer 10 to perform as described herein. A computer program product can include a medium with non-transitory computer program code that when executed causes the door closer 10 to operate as described herein. The present invention may be embodied as a method, device, article, system, computer program product, or a combination of the foregoing. Any suitable computer usable or computer readable medium may be utilized for a computer program product to implement all or part of the system. The computer usable or computer readable medium may be, for example but not limited to, a tangible electronic, magnetic, optical, electromagnetic, or semiconductor system, apparatus or device. More specific examples of the computer readable medium may include, but is not limited to, the following: a portable computer diskette, a hard disk, a random-access memory (RAM), a read-only memory (ROM), an erasable programmable read-only memory (EPROM or Flash memory), a portable compact disc read-only memory (CD-ROM), or an optical storage device.

Computer program code for carrying out operations of the present invention or for assisting in the carrying out of a method according to an example embodiment of the invention may be written in an object oriented, scripted or unscripted programming language such as Java, Peri, python, C++ or the like. However, the computer program code for carrying out operations of the present invention may also be written in conventional procedural programming languages, such as the "C" programming language or similar programming languages. The computer program code may also be written in HTML5 or similar languages that are commonly used for applications or "apps" intended to be run on mobile computing devices such as smart phones, tablets, and the like. While specific examples of programming languages are described herein, these examples are not exhaustive, and the computer program code may be written in any suitable programming language.

Computer program instructions may be provided to the controller 20 to produce a machine, such that the instructions, which execute via the processor of the controller 20, create a device for implementing the functions necessary to carry out the embodiments as described herein. Computer program instructions may also be provided as firmware for an embedded controller 20 or a plurality of embedded controllers 20.

The controller 20 includes, or is in communication with, an onboard communication interface, such as a wired communication interface and/or a wireless communication interface (e.g., wireless communication chip) that communicates with a user device, such as a user computer system (e.g., mobile devices, such as remote control, smartphone, smart-wearable device—watches, glasses, or the like) or an access control device (e.g., badge, fob, electronic key, card, or the like) over a wireless connection. It should be understood that the wireless communication may occur over any type of wireless network, or such communication may occur directly between the controller 20 and the user device (e.g., user computer system, or the like) such that the controller 20 does not require access to an external network (e.g., external Wi-Fi network, the cellular network or other external network). As used herein, the term "directly communicates" means that the user device (e.g., user computer system) communicates with the on-board communication interface without an intervening network such as an external wireless network (e.g., external Wi-Fi network, LAN or WAN, or other external wireless protocol). In some embodiments, the controller 20 may be directly coupled to, and may directly communicate with, user device over relatively short distance using the wireless communication interface. The controller 20 may be coupled to the user device via the wireless communication interface that communicates using a wireless networking protocol, such as WiFi based on the institute of Electrical and Electronics Engineers (IEEE) 802.11 standards, Bluetooth short-wavelength UHF radio waves in the ISM band from 2.4 to 2.485 GHz, a proprietary communication interface or other wireless access technology whether or not described herein.

While in some embodiments, the communication interface communicates directly with the user device over a short range via a wireless connection such as WiFi, Bluetooth or other wireless access technology, a wireless connection may operate over long or intermediate ranges and may include intervening networks. In this regard, the door closer 10, such as the controller 20, may comprise a transceiver that is configured to operate with one or more air interface standards, communication protocols, modulation types, and access types to communicate with user devices. By way of illustration, the door system 10, such as the controller 20, may include a transceiver that may be configured to operate in accordance with any of a number of first, second, third, fourth, fifth, and/or the like generation communication protocols and/or the like. For example, the door closer 10 may be configured to operate in accordance with second-generation (2G) wireless communication protocols IS-136 (time division multiple access (TDMA)), GSM (global. system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with 1, TE protocols, with 3GPP protocols, with fifth-generation (5G) wireless communication protocols, and/or the like. The door system 10 may also be configured to operate in accordance with non-cellular communication mechanisms, such as via a wireless local area network (WLAN) or other communication/data networks.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "upper," "lower," "left," "right," "horizontal," "vertical," "upward," and "downward" merely describe the configuration shown in the figures. The referenced components may be oriented in an orientation other than that shown in the drawings and the terminology, therefore, should be understood as encompassing such variations unless specified otherwise. It will be understood that when an element is referred to as being "connected," "coupled," or "operatively coupled" to another element, the elements can be formed integrally with each other, or may be formed separately and put together. Furthermore, "connected," "coupled," or "operatively coupled" to can mean the element is directly connected, coupled, or operatively coupled to the other element, or intervening elements may be present between the elements. Furthermore, "connected," "coupled," or operatively coupled" may mean that the elements are detachable from each other, or that they are permanently coupled together.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A door closer, the door closer comprising:
   a casing;
   a closing device located at least partially within the casing, wherein the closing device is configured to aid in closing a door by providing a closing force to the door; and
   a force adjustment device comprising a motor, wherein the force adjustment device is located at least partially outside of the casing and operatively coupled to the closing device;
   a position sensor, wherein the position sensor is used to determine a position of the door;
   a controller located at least partially outside of the casing and operatively coupled to the motor and the position sensor, wherein the controller comprises:
      one or more memory devices with computer-readable program code stored thereon; and
      one or more processing devices operatively coupled to the one or more memory devices, wherein when executed the computer-readable program code is configured to direct the one or more processing devices to:
         determine the position of the door; and
         control the motor to adjust an opening force or the closing force based on the position of the door and a force and position adjustment curve.

2. The door closer of claim 1, wherein the closing device comprises a spring, wherein the motor is operatively coupled to the spring, and wherein the motor adjusts the closing force or the opening force by adjusting a preload of the spring.

3. The door closer of claim 2, further comprising a damper operatively coupled to the spring for controlling a closing speed of the door.

4. The door closer of claim 2, wherein the spring is a single spring, and wherein adjusting the preload of the single spring comprises turning a fastener to increase or decrease the preload of the single spring.

5. The door closer of claim 1, wherein as the door is moving from an open position to a closed position, the force adjustment device increases the closing force when the door reaches an angle from the closed position.

6. The door closer of claim 5, wherein the angle is a pre-determined angle from the closed position.

7. The door closer of claim 1, wherein when the position sensor indicates the door has stopped moving towards a closed position or an open position, the force adjustment device increases the closing force to move the door to the closed position.

8. The door closer of claim 1, wherein when the position sensor indicates that the door has stopped moving and the door is in a closed position, the force adjustment device decreases the opening force.

9. The door closing of claim 1, wherein when the position sensor indicates that the door is moving towards an open position and the closing device is not set to a preferred opening force, the force adjustment device decreases the opening force to the preferred opening force.

10. The door closer of claim 1, wherein the force adjustment device further comprises a gear assembly operatively coupled between the motor and the closing device.

11. The door closer of claim 1, further comprising:
   a drive system operatively coupled to the closing device; and
   a linkage assembly operatively coupled to the drive system;
   wherein the drive system and the linkage assembly are operatively coupled to the door, a door frame, or a wall to allow for opening and closing of the door.

12. A method of operating a door using a force adjustment device operatively coupled to a closing device, wherein the closing device is located at least partially within a casing and the force adjustment device comprises a motor and is located outside of the casing, the method comprising:
   identifying the door is moving towards a closed position or the door is stopped before the closed position, and adjusting a closing force using the force adjustment device by increasing a preload of the closing device; or
   identifying that the door is moving towards an open position, and adjusting the closing force using the force adjustment device by decreasing the preload of the closing device.

13. An apparatus for aiding a closing device of a door closer, the apparatus comprises:

a force adjustment device comprising a motor, wherein the force adjustment device is configured to be operatively coupled to a connector of the closing device having a spring;

a position sensor, wherein the position sensor is configured to be operatively coupled to the door or the door closer for determining a position of the door;

a controller operatively coupled to the motor and the position sensor, wherein the controller comprises:

one or more memory devices with computer-readable program code stored thereon; and one or more processing devices operatively coupled to the one or more memory devices, wherein during operation when executed the computer-readable program code is configured to direct the one or more processing devices to:

determine the position of the door; and control the motor to adjust an opening force or a closing force by adjusting a preload of the spring based on the position of the door;

wherein the force adjustment device, the position sensor, and the controller are configured to be operatively coupled to the door closer.

14. The apparatus of claim 13, wherein during operation adjusting the preload of the spring comprises turning a fastener to increase or decrease the preload of the spring.

15. The apparatus of claim 13, wherein during operation as the door is moving from an open position to a closed position, the force adjustment device increases the closing force when the door reaches an angle from the closed position or has stopped moving to move the door to the closed position.

16. The apparatus of claim 13, wherein during operation when the position sensor indicates that the door has stopped moving and the door is in a closed position, the force adjustment device decreases the opening force.

17. The apparatus of claim 13, wherein during operation when the position sensor indicates that the door is moving towards an open position and the closing device is not set to a preferred opening force, the force adjustment device decreases the opening force to the preferred opening force.

18. The apparatus of claim 13, wherein during operation the controller adjusts the closing force based on a force and position adjustment curve.

19. The apparatus of claim 13, wherein the force adjustment device further comprises a gear assembly operatively coupled to the motor.

* * * * *